United States Patent [19]

Albers, Jr.

[11] Patent Number: 6,026,766

[45] Date of Patent: Feb. 22, 2000

[54] DAIRY FREESTALL HOUSING APPARATUS

[76] Inventor: Teo Albers, Jr., 13437 Mountain Ave. 93536, Chino, Calif. 91710

[21] Appl. No.: 09/053,380

[22] Filed: Mar. 31, 1998

[51] Int. Cl.$^7$ ........................................................ A01K 5/00
[52] U.S. Cl. .............................................................. 119/520
[58] Field of Search .................................... 119/520, 502, 119/512, 513, 516, 519, 522

[56] References Cited

U.S. PATENT DOCUMENTS

| | | | |
|---|---|---|---|
| 1,142,246 | 6/1915 | Gagan ...................................... | 119/521 |
| 2,642,037 | 6/1953 | Merrill ..................................... | 119/520 |
| 5,111,770 | 5/1992 | Weelink .................................... | 119/521 |

FOREIGN PATENT DOCUMENTS

| | | | |
|---|---|---|---|
| 2514892 | 10/1976 | Germany ................................. | 119/521 |
| 1380414 | 1/1975 | United Kingdom ..................... | 119/523 |

OTHER PUBLICATIONS

Document No., DPC–1 NRAES 76 entitled Guideline for Planning Diary Freestall Barns published Oct., 1995 by Northeast Regional Agricultural Engineering Service.

*Primary Examiner*—Thomas Price
*Attorney, Agent, or Firm*—Fulwider Patton Lee & Utecht, LLP

[57] ABSTRACT

Dairy freestall apparatus having a plurality of pipe loops removably adjustably clamped to a pair of rails at right angles to such rails to define one or more rows of cow stalls. The rails are removably vertically clamped to a plurality of aligned posts.

13 Claims, 8 Drawing Sheets

DAIRY FREESTALL HOUSING APPARATUS

BACKGROUND OF THE INVENTION

The present invention relates generally to the dairy art and more particularly, to dairy freestall housing apparatus.

Dairy freestall housing provides for the resting, eating, exercising and drinking of producing dairy cows. The primary purpose of a freestall system is to shelter cows and their feeding and resting areas from hot summer sun, precipitation and cold winds, while providing optimum ventilation during all periods of the year. Cow freestalls or cubicles provide the cows with a clean dry and comfortable resting area. The cow is not restrained but is free to lie down, stand up, enter and leave the freestall whenever she desires. A dairy freestall system includes one or more rows of stalls, with each stall accommodating a single cow. The stalls should provide comfort, promote cleanliness and prevent injuries to the cows while providing enough room for the largest cow in the herd, as well as smaller cows, to enter freely, lie down, rest comfortably and rise easily. The stalls are defined by pairs of like pipe loops which extend horizontally over the base of the stall with their front ends secured to a pair of rails at an angle of 90° to such rails. The upper reach of each pipe loop is horizontally provided with an elongated training restraint designed to force a cow to back out of her stall so as to defecate in the freestall alley rather than upon the base of the stall where the cow stands. The alleys provide the cow with safe convenient passages to other areas of the freestall system and such alleys also can form part of the manure handling system. Manure, urine and spilled feed that accumulates in the alleys are removed by using a scraper, flushing with water or allowing manure to drop through holes in slotted floors. Manure must be removed regularly from the cow housing area to be placed in storage or directly applied to agricultural fields. In the absence of frequent manure removal, messy alleys and dirty cows will result.

SUMMARY OF THE INVENTION

In most existing dairy freestall systems the front ends of the stall pipe loops are welded to their supporting rails and the rails are welded to their supporting posts. Similarly, the training restraint is usually fixedly welded to the upper reach of each pipe loop. Welding of the pipe loops to the rails and the rails to the posts is costly, time consuming and in many cases a welder or welding equipment is not available when needed to effect repairs or to adjust the pipe loops relative to their support rails to accommodate cows of varying sizes. Additionally, welds tend to break when the metal of the pipe loops and/or rails expand or contract during extreme temperature changes. Applicant solved the problems inherent with welding by providing readily installed clamping members to attach the pipe loops to their rails and the rails to their supporting posts, enabling even unskilled workers to effect initial securement of the pipe rails to their respective support rails and to thereafter change the spacing of the pipe loops relative to their support rails. Additionally, applicant provides a unique adjustable sleeve to movably position a training restraint element which permits the spacing of the training restraint relative to the pipe loops to be easily accomplished. Applicant's invention is usable both with a single row of stalls or with a double row of oppositely-facing stalls.

These and other features and advantages of the present invention will become apparent from the following detailed description of preferred embodiments which, taken in conjunction with the accompanying drawings, illustrates by way of example the principles of the invention.

DETAILED DESCRIPTION OF PREFERRED EMBODIMENTS

Figure 1:
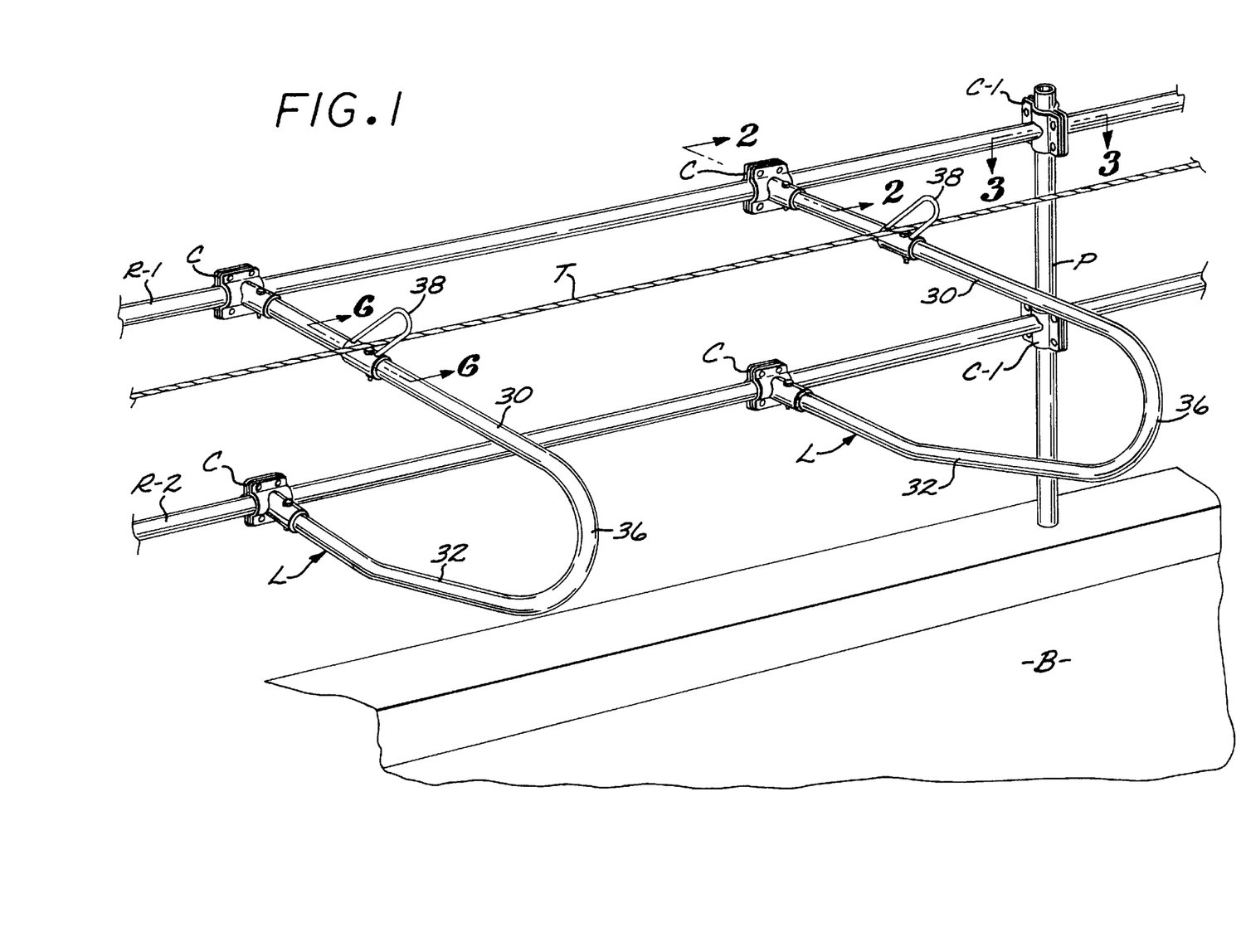
FIG. 1 is a broken perspective view of a dairy freestall apparatus embodying the present invention as applied to a single row of stalls.
Figure 2:
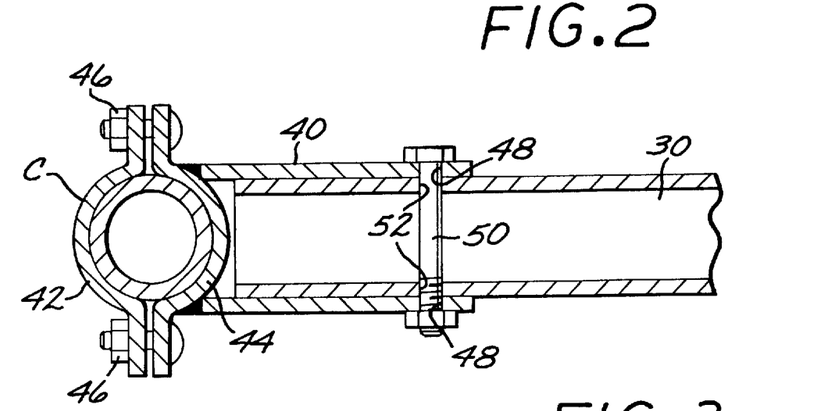
FIG. 2 is a vertical sectional view taken in enlarged scale along line 2—2 in FIG. 1 of a rail clamp.
Figure 6:
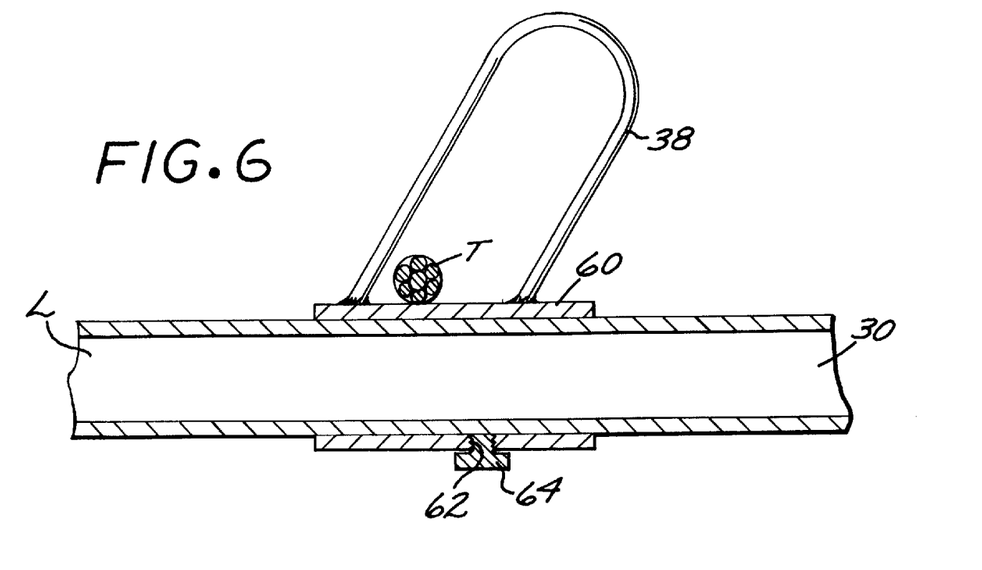
FIG. 6 is a broken side elevational view taken in enlarged scale along lines 6—6 of FIG. 1.

Referring to the drawings, there is illustrated in FIGS. 1–3 and 6 a first form of dairy freestall apparatus embodying the present invention. FIG. 1 illustrates a single stall arrangement utilizing a row of horizontally extending pipe loops L having their front ends attached to horizontal upper and lower rails R-1 and R-2, with the rails being secured in parallel relationship to vertically extending aligned pipe posts P that extend upwardly from the front of stall base B. The pipe loops are of like, integral construction, having an horizontally extending upper reach 30 and a generally horizontally extending lower reach 32. The rear portions of the upper and lower reaches merge into an arcuate intermediate portion 36. The front ends of the upper and lower reaches are removably and horizontally adjustably attached to upper and lower rails R-1 and R-2 by like rail clamp members C. Referring to FIGS. 1 and 6, each of the upper pipe loop reaches 30 support an upwardly extending rearwardly inclined positioner 38 having a generally inverted U-shape through which an elongated training restrainer T is contained. Training restrainer T of FIGS. 1 and 6 takes the form of a flexible cable.

More particularly, the pipe loops L are bent from suitable galvanized steel or the like in a conventional mariner. The front ends of the upper and lower pipe reaches 30 and 32, respectively, are slidably received by a rearwardly extending horizontal sleeve 40 element of clamp C, as shown particularly in FIG. 2. Rail clamp C includes split strap halves 42 and 44 that encircle a rail and are removably secured together by conventional nut and bolt combinations 46. The front end of the aforementioned sleeve 40 is welded to rear split clamp half 44. The rear portion of the sleeve 40 is formed with a pair of vertically aligned apertures 48 that removably receive a conventional bolt and nut combination 50. Sleeve apertures 48 are vertically aligned with complementary vertically aligned apertures 52 that removably receive the bolt of bolt and nut combination 50.

Figure 3:
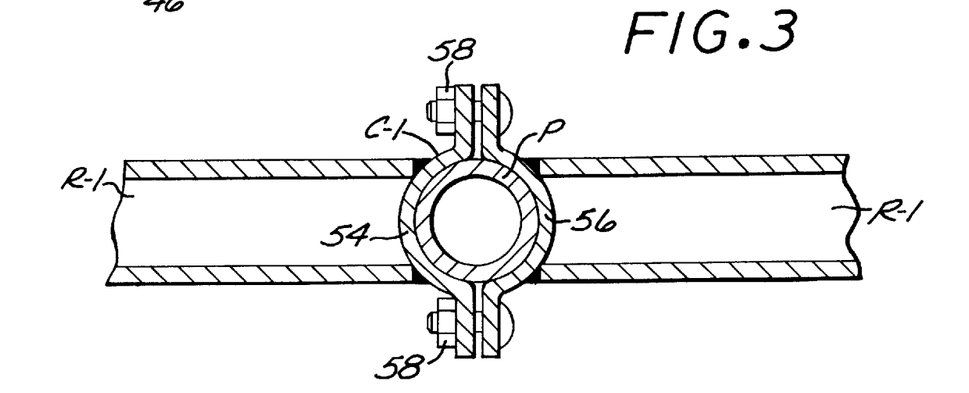
FIG. 3 is a horizontal sectional view taken in enlarged scale along line 3—3 of FIG. 1 of a post clamp.

Referring to FIG. 3, the ends of the pipe rails R-1 and R-2 are shown removably and vertically adjustably secured to vertical post P by like conventional upper and lower sleevetype post clamps C-1. Referring to FIG. 3, each post clamp C-1 includes a split half 54 welded to one end of a rail R-1. Split strap half 54 is removably connected by upper and lower conventional belt and nut combinations 58 to a complementary split strap half 56 of the adjoining rail R-1.

Referring to FIG. 6, training cable T is shown disposed within the confines of a looped positioner 38 for free movement relative to such positioner and hence pipe stall loop L. The lower legs of positioner 38 are welded to a horizontally extending cylinder 60 provided with a threaded bore 62 that receives adjustment bolt 64. Cylinder 60 is longitudinally slidably carried by the upper reach 30 of pipe loop L. This arrangement permits the horizontal location of positioner 38 relative to upper pipe stall reach 30 to be readily adjusted by tightening or loosening adjustment bolt 64. Since the restrainer cable T is free to move within the confines of positioner 38, such cable contains the cows without needless aggravation.

It is desirable to select the horizontal spacing between the stall pipe loops L depending upon the size and age of the cow to be contained between the loops. With the apparatus of the present invention, variation in such spacing can be readily accomplished by tightening and loosening the bolt and nut combinations 46 of the rail clamps C. Loosening of the bolt and nut combinations permits the clamps to slide horizontally along their supporting rails R-1 and R-2. In practice, the horizontal spacing between loops L approximates about four feet. Securement of the front ends of the stall pipe loops L to their respective rail clamps C is readily and quickly accomplished by means of the interconnection of the front ends of the pipe stall loops L with the sleeves 40 of rail clamp C. After the front ends of the stall pipe loops L have been telescopically slidably inserted within sleeves 40, the bolt of bolt and nut combination 50 is inserted within the vertically aligned apertures 48 and 50, with the nut element of such combination thereafter being tightened on the bolt element. This securement arrangement makes it possible to quickly and easily substitute different sizes and configurations of stall pipe loops L on the rails R-1 and R-2 so as to meet the varying requirements of cows of different sizes and ages.

Referring to FIGS. 1 and 3, attachment of the ends of rails R-1 and R-2 to post P can be quickly and easily accomplished by means of post clamps C-1. Additionally, vertical spacing of such rails can be adjusted by tightening and loosening bolt and nut combinations 58.

Referring now to FIGS. 4, 5 and 7–10, there is shown a second form of dairy freestall apparatus embodying the present invention. In this form, stall pipe loops L' are generally identical to the stall pipe loops L of FIGS. 1–3, except that they define in two rows of mirrorimage facing stalls rather than a single row of stalls. Referring to FIG. 5, 9, 10 and 13–15, the front ends of the upper reaches 30' of the stall pipe loops L' telescopically interfit with sleeves 40' of like upper rail clamps C'. Rail clamps C' are identical in construction to the aforedescribed rail clamps C. The front ends of the upper and lower pipe stall reaches 30' are releasably retained within rail clamp sleeves 40' by bolt and nut combinations 50'.

Figure 5:
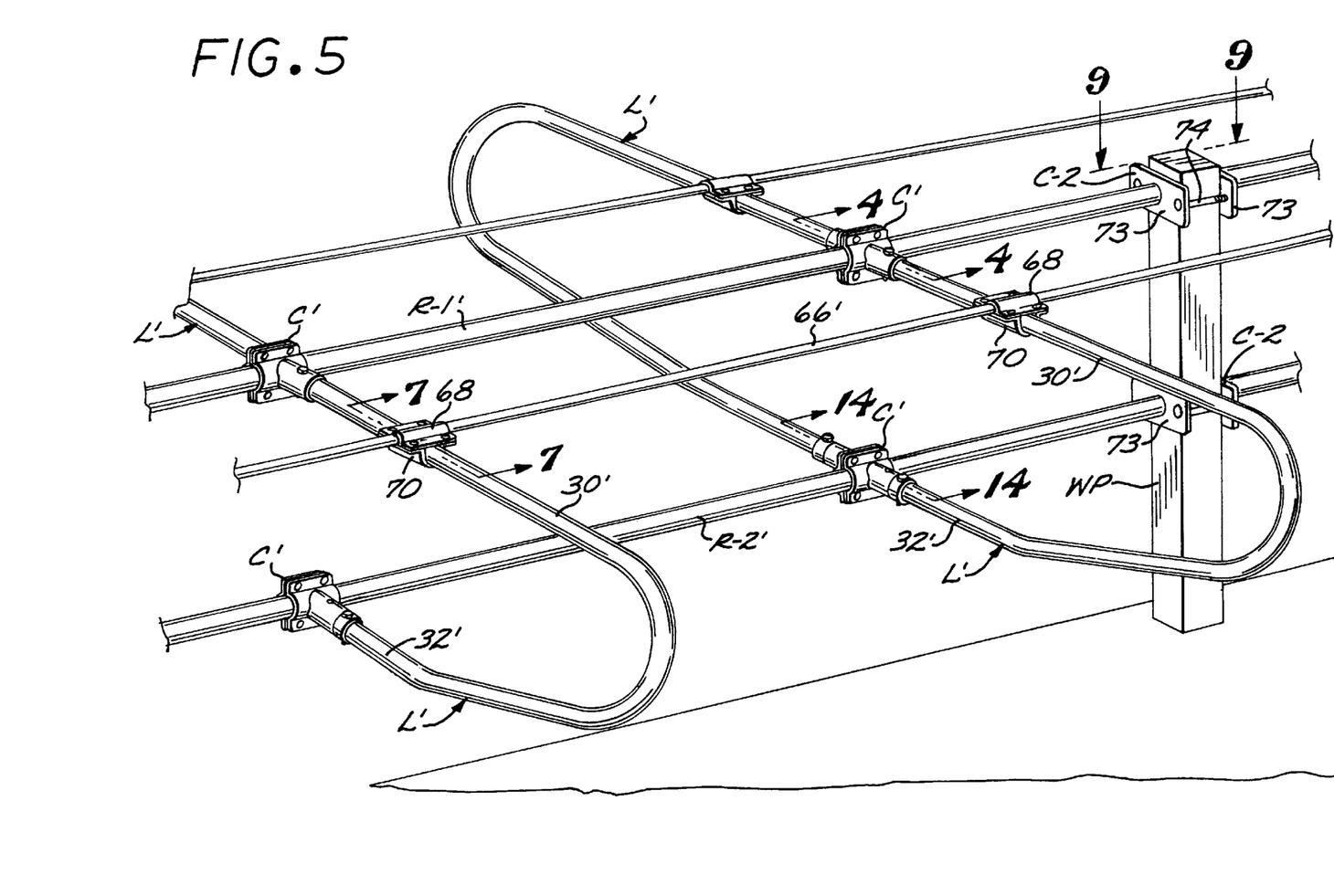
FIG. 5 is a broken perspective view showing applicant's dairy freestall apparatus as employed in a system utilizing two rows of mirror-image facing stalls.
Figure 7:
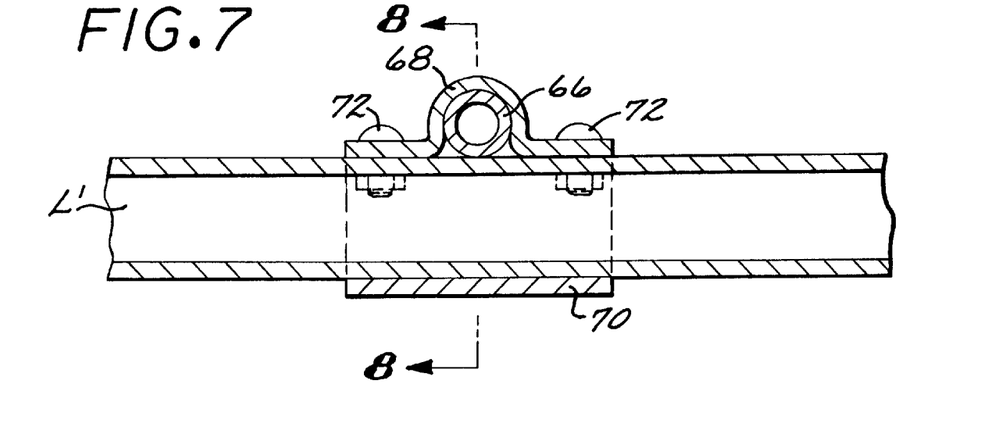
FIG. 7 is a broken side elevational view taken in enlarged scale along line 7—7 of FIG. 5.
Figure 8:
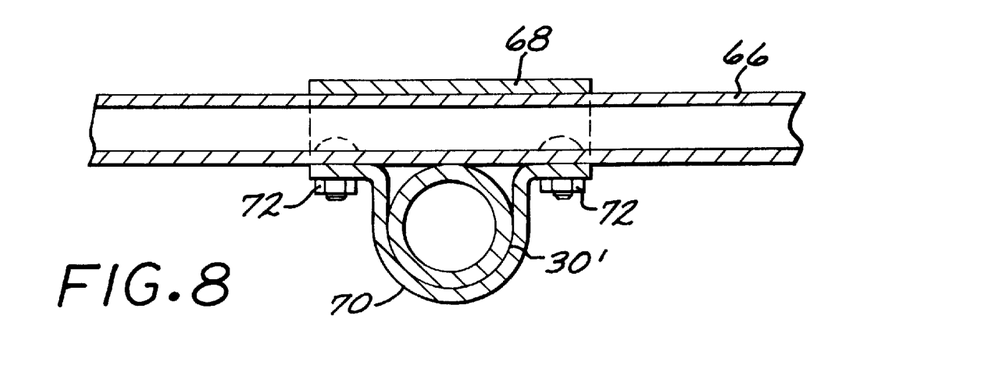
FIG. 8 is a vertical sectional view taken along line 8—8 of FIG. 7.

The connection of the front ends of the lower pipe reaches 32' and lower rail clamp C' are described hereinafter. As indicated in FIGS. 5, 7 and 8, the training restrainer of this embodiment takes the form of a rod 66 contained within the center portion of a generally U-shaped conventional upper strap 68. Upper strap 68 is removably secured to a generally U-shaped lower strap 70 the center portion of which encircles upper reach 30' of pipe stall loop L' at right angles to the upper strap 68. The straps 68 and 70 are removably interconnected by bolt nut combinations 72 so as to be longitudinally slidably adjustable relative to the upper pipe stall reach 30'.

Figure 9:
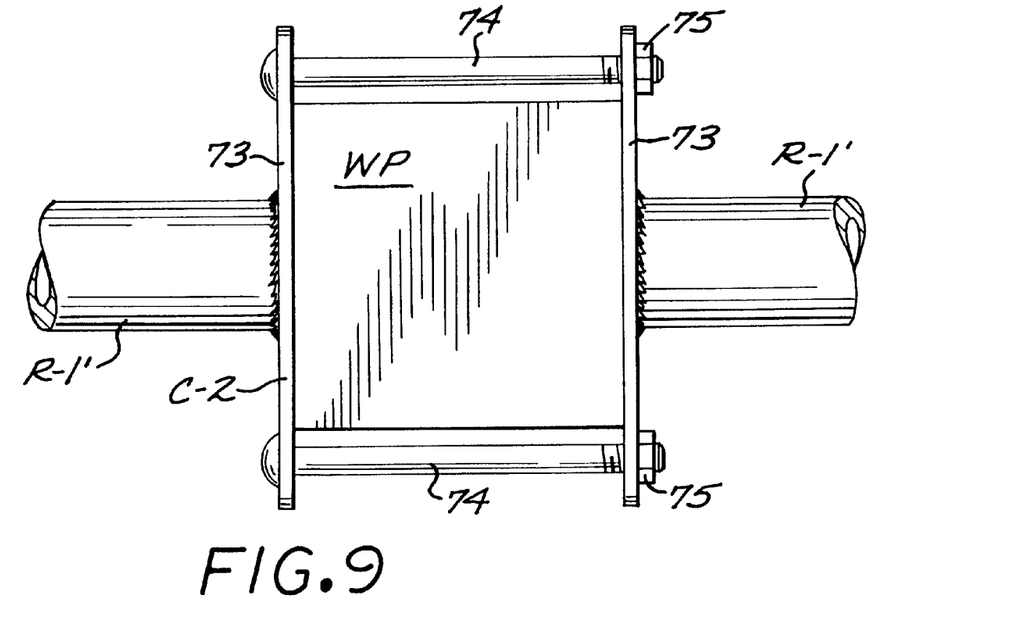
FIG. 9 is a top broken top plan view taken from the point designated 9—9 in FIG. 5 showing a post clamp.

Referring to FIGS. 5 and 9, the ends of the upper and lower rails R-1' and R-2' are removably, vertically, and adjustably supported by wooden posts WP by means of post clamps C-2, each clamp consisting of a vertical plate 73 secured by welding to each end of the rails, and a pair of elongated bolts 74 which extend through the oppositely spaced plates 73 of contiguous rails on opposite sides of post WP to removably receive a nut 75. This arrangement permits the upper and lower rails R-1' and R-2' to be readily but removably secured to and removed from the posts WP, as well as permitting vertical adjustment of the rails relative to such post.

Figure 10:
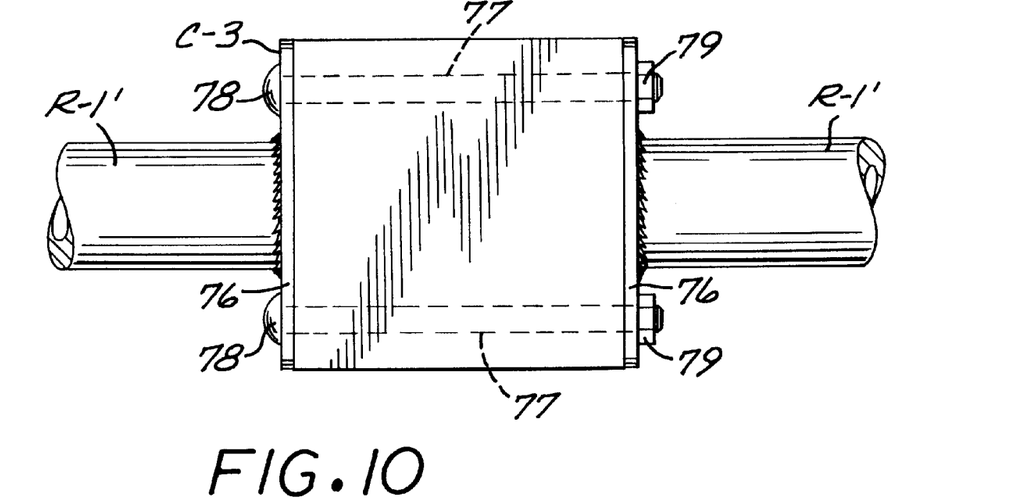
FIG. 10 is a top plan view of another form of the post clamp of FIG. 9.

Referring to FIG. 10, there is shown another form of post clamp C-3 consisting of a vertical plate 76 secured by welding to each end of the rails. The post WP is formed with a pair of horizontally (extending bores 77 that removably receive a pair of bolts 78 that removably receive nuts 79 to attach the rails to the post.

Figure 11:
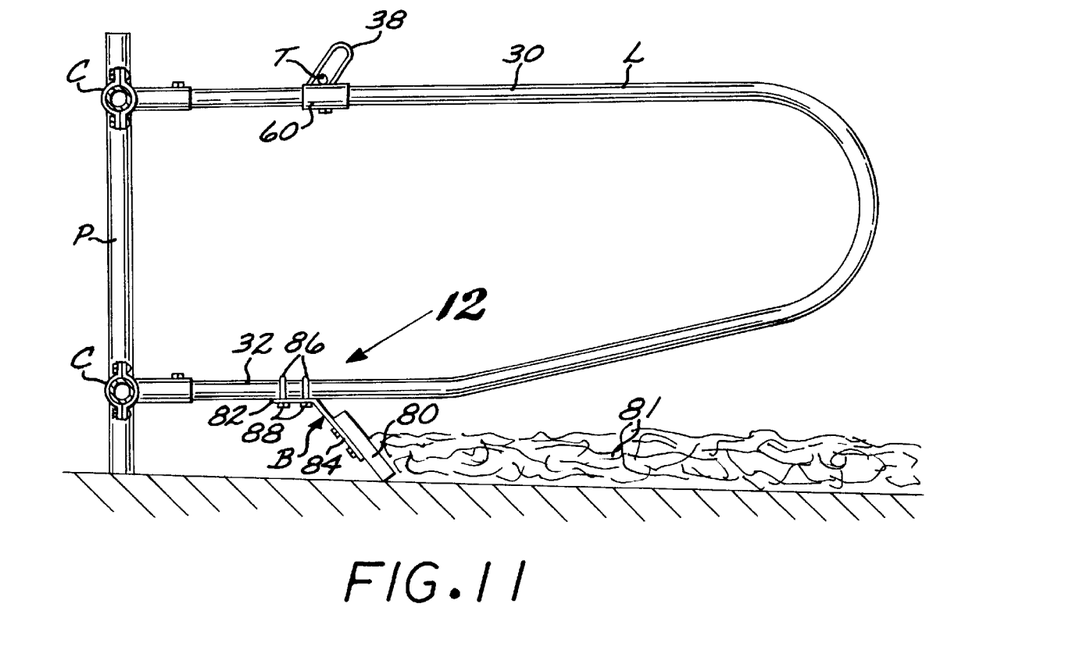
FIG. 11 is a side elevational view showing a stall pipe loop of FIG. 1 provided with a brisket board.
Figure 12:
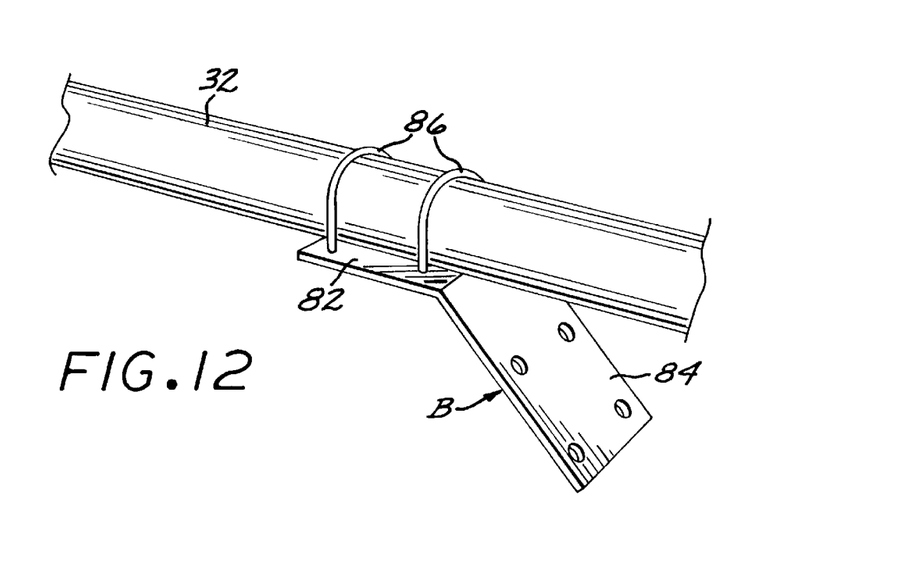
FIG. 12 is a broken sectional view showing a support bracket for the brisket board of FIG. 12.

Referring to FIGS. 11 and 12, the stall pipe loop L of FIG. 1 is shown provided with a brisket board 80 to retain cow bedding 81. The brisket board 80 is carried by an angled bracket B having a horizontal base 82 and a rearwardly and downwardly extending brisket board support plate 84. The base 82 is removably secured to the lower pipe loop reach 32 by a pair of conventional inverted U-shaped retainers 86 having threaded lower ends to receive nuts 88. The nuts 88 may be loosened and tightened so as to permit adjustable longitudinal movement of the brisket board 80 relative to the pipe stall loops to thereby accommodate cows of varying sizes. Note that in FIG. 12, the brisket board 80 is not shown in the interest of clarity.

Figure 13:
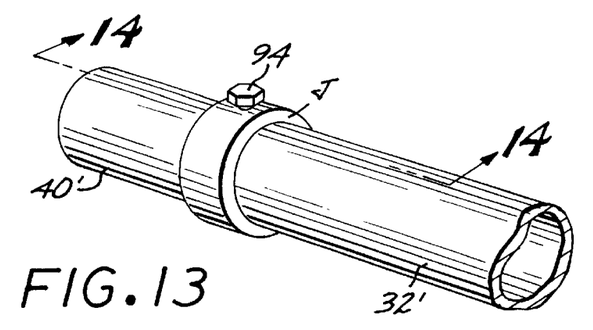
FIG. 13 is a broken sectional view of a jam ring utilized with apparatus embodying the present invention.
Figure 14:
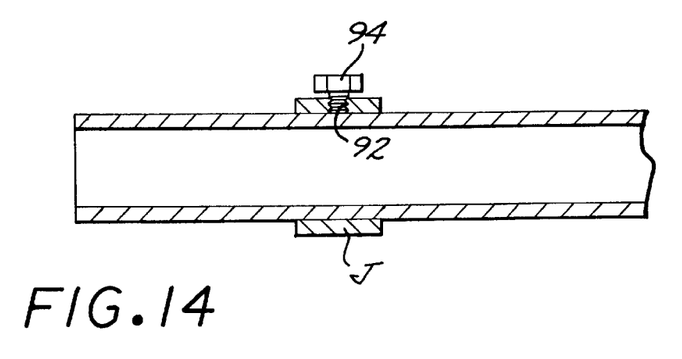
FIG. 14 is a vertical sectional view taken along line 14—14 of FIG. 13.
Figure 15:
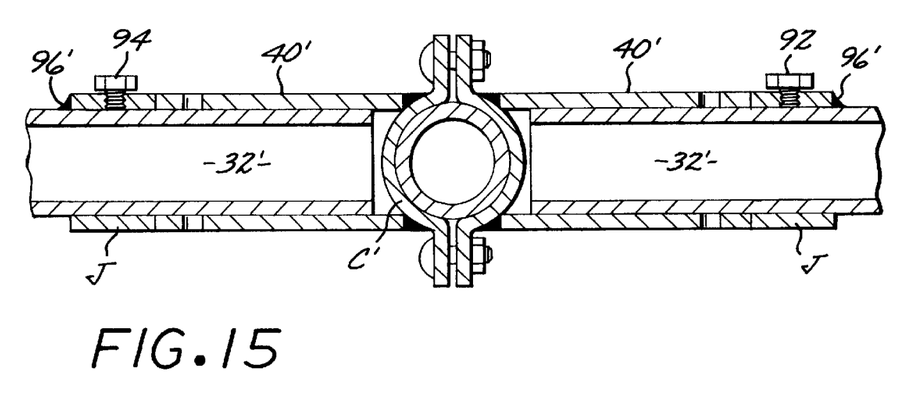
FIG. 15 is a vertical sectional view taken in enlarged scale along line 15—15 of FIG. 5.

Referring again to FIG. 5 and additionally to FIGS. 13–14, there is shown a jam ring J which may be utilized to removably secure the front ends of lower pipe reaches 32' to the lower rail clamps C'. Each jam ring J is telescopically slidably disposed upon the front portion of the lower pipe reach 32'. Aperture 92 in ring 90 receives a set screw 94 the front end of lower pipe reach 32' is first slid into lower rail clamp sleeve 40'. Set screw 94 is inserted in apertures 92. The pipe loop L' is then manually leveled, and jam ring J held against the outer end of lower rail clamp sleeve 40'. Thereafter, set screw 94 is tightened to hold the pipe loop L' in its leveled position while a tack weld 96 is made between the outer end of the jam ring J and the lower pipe reach 32', as shown in FIG. 15.

Figure 4:
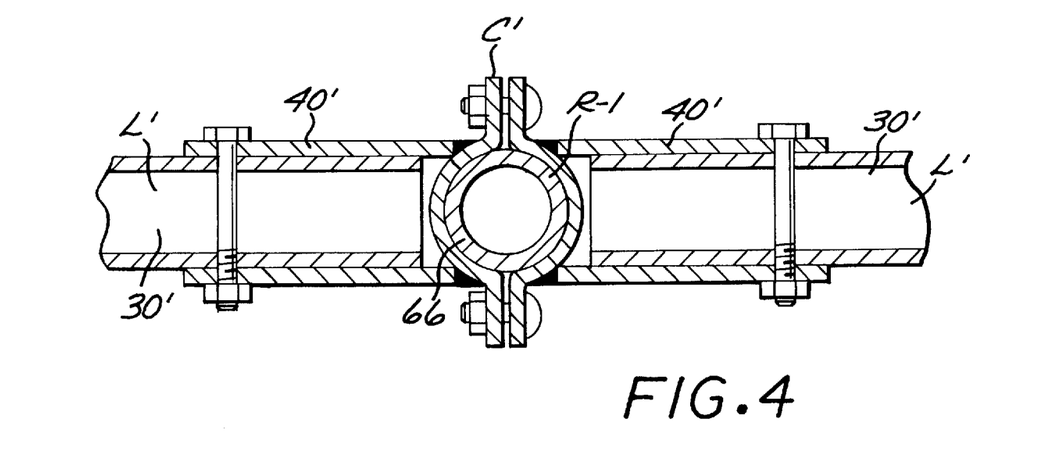
FIG. 4 is a horizontal sectional view taken in enlarged scale along line 4—4 of FIG. 5.
Figure 16:
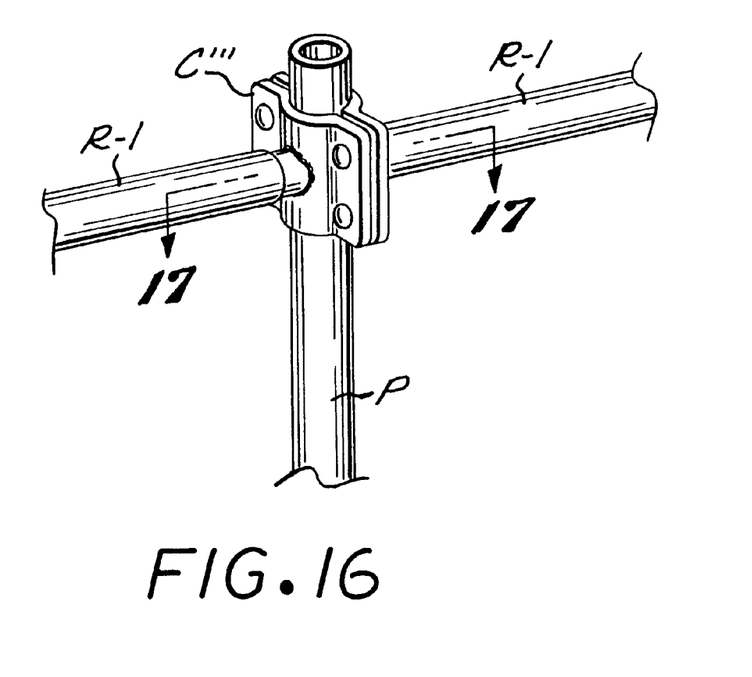
FIG. 16 is a broken perspective view of a modified form of post clamp of the present invention.
Figure 17:
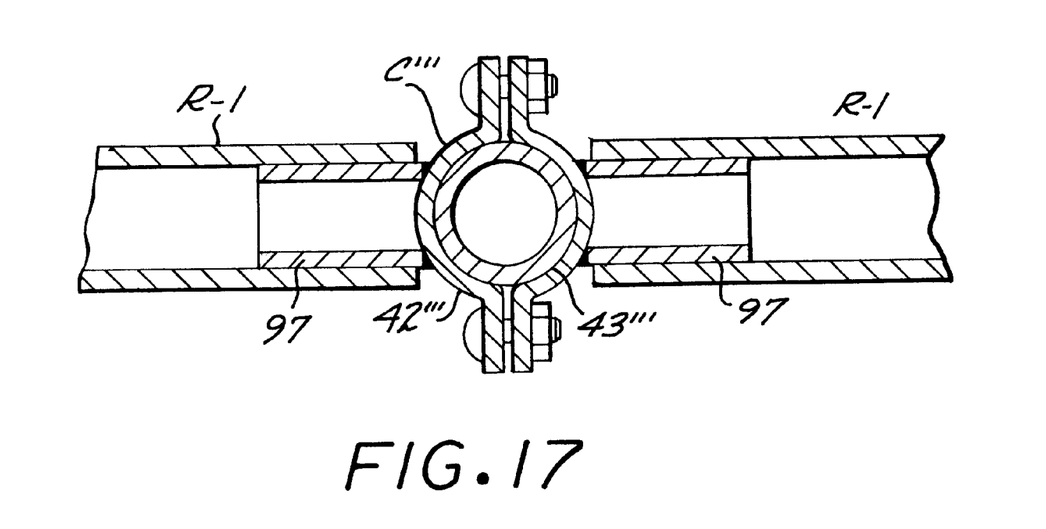
FIG. 17 is a sectional view taken in enlarged scale along line 17—17 of FIG. 16.

Referring now to FIGS. 16 and 17, there is shown a modified arrangement of clamp C''' for releasably securing rails R-l of FIG. 4 to vertical post P. In such arrangement, a pair of butt tubes 97 are welded to opposite sides of the strap halves 42''' and 43''' to removably receive the ends of rails R-1.

It will be apparent to those skilled in the dairy art that the aforedescribed dairy freestall apparatus eliminates costly welding and the time required to effect such welding, provides complete flexibility so that even an unskilled dairyman can install and readjust the freestall loops for younger or larger animals using common tools by simply loosening and tightening bolts and nuts. Moreover, such apparatus avoids problems inherent with expansion and contraction of steel in extreme climates where welds tend to break.

Various modifications and changes may be made with respect to the foregoing detailed description without departing from the spirit of the present invention. By way of example, although rails, posts and pipe stall loops of circular cross-section are shown in the drawings, tubular members of other cross-section may be employed i.e., square cross-section.

What is claimed is:

1. Dairy freestall apparatus, comprising:
   a pair of vertically spaced horizontal rails;
   a plurality of vertically extending aligned posts;
   a plurality of pipe loops, each having a horizontally extending upper reach and a generally horizontally extending lower reach vertically aligned with the upper reach and the rear ends of the upper and lower reaches merge into an arcuate intermediate portion;
   rail clamps removably and horizontally attached to the upper and lower rails, each of the clamps having a rearwardly extending horizontal sleeve for removably receiving the front ends of the reaches of the pipe loops;
   a bolt and nut combination removably securing the front ends of each of the pipe loops within their respective sleeves; and
   post clamps removably vertically adjustably secured to the posts for attaching the ends of the rails to the posts.

2. Dairy freestall apparatus as set forth in claim 1, wherein the pipe stall loops are arranged in two rows of loops defining a plurality of mirror image facing stalls.

3. Dairy freestall apparatus as set forth in claim 2, wherein the post clamps each include a first split half fixedly secured to a horizontally extending sleeve, such first split half rail is removably connected to a second complementary split half fixedly secured to a second horizontally extending sleeve, and with the sleeves removably receiving the ends of rails disposed at opposite sides of a post.

4. Dairy freestall apparatus as set forth in claim 3 wherein the post clamps each include a vertical plate fixedly secured to the end of each rail that abuts one side of a post and is removably connected to the vertical plate of a second horizontally aligned rail disposed at the side of the post opposite the first-mentioned vertical plate.

5. Dairy freestall apparatus as set forth in claim 3 which further includes a brisket board adjustably removably attached to the lower reach of each pipe loop.

6. Dairy freestall apparatus as set forth in claim 1 wherein the rail clamps each include a pair of front and rear split halves that encircle a rail and are interconnected by bolt and nut combinations, with the rearwardly extending horizontal sleeve being affixed to the rear split half.

7. Dairy freestall apparatus as set forth in claim 1, which further includes an elongated training restrainer horizontally adjustably secured to the intermediate portion of each upper pipe reach.

8. Dairy freestall apparatus as set forth in claim 1, wherein the post clamps each include a vertical plate fixedly secured to the end of each rail that abuts one side of a post and is removably connected to the vertical plate of a second horizontally aligned rail disposed at the side of the post opposite the first-mentioned vertical plate.

9. Dairy freestall apparatus as set forth in claim 1 which further includes an elongated training restrainer cable, a trainer restrainer positioner and a cylinder, the positioner being secured to the cylinder, and the cylinder being horizontally adjustably slidable on the upper reach of the pipe loops, and the training restrainer cable freely extends through the positioner.

10. Dairy apparatus as set forth in claim 1 which further includes a brisket board adjustably longitudinally movably attached to the lower reach of each pipe loop.

11. Dairy freestall apparatus, comprising:
    a pair of vertically spaced horizontal rails;
    a plurality of vertically extending aligned posts;
    a plurality of pipe loops, each having a horizontally extending upper reach and a generally horizontally extending lower reach vertically aligned with the upper reach and the rear ends of the upper and lower reaches merge into an arcuate intermediate position;
    rail clamps removably and horizontally attached to the upper and lower rails, each of the clamps having a rearwardly extending horizontal sleeve for removably receiving the front ends of the reaches of the pipe loops;
    a bolt and nut combination removably securing the front ends of each of the pipe loops within their respective sleeves;
    post clamps removably vertically adjustably secured to the posts for attaching the ends of the rails to the posts;
    a jam ring slidably supported upon the lower front portion of each lower pipe reach to engage the rear end of one of said horizontal sleeves; and
    a set screw extending through each jam ring to engage its respective lower pipe reach to support such lower pipe reach and its pipe loop in a level position wherein the jam ring is welded to its lower pipe reach.

12. Dairy freestall apparatus as set forth in claim 11 wherein the rail clamps each include a pair of front and rear split halves that encircle a rail and are interconnected by bolt and nut combinations, with the rearwardly extending horizontal sleeve being affixed to the rear split half.

13. Dairy freestall apparatus of claim 12 which further include an elongated training restrainer cable, a trainer restrainer positioner and a cylinder, the positioner being secured to the cylinder, and the cylinder being horizontally adjustably slidable on the upper reach of the pipe loops, and the trainer restrainer cable freely extends through the positioner.

* * * * *